(12) United States Patent
Braig et al.

(10) Patent No.: US 9,095,148 B2
(45) Date of Patent: Aug. 4, 2015

(54) DEVICE AND METHOD OF MANUFACTURING AND FILLING UP FINE SAUSAGE MEAT, IN PARTICULAR AN EMULSION

(75) Inventors: Wolfgang Braig, Laupheim (DE); Manfred Baechtle, Schemmerhofen (DE); Siegfried Reutter, Eberhardzell (DE); Gerhard Mueller, Schemmerhofen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 278 days.

(21) Appl. No.: 13/083,972

(22) Filed: Apr. 11, 2011

(65) Prior Publication Data

US 2011/0248105 A1    Oct. 13, 2011

(30) Foreign Application Priority Data

Apr. 13, 2010 (EP) .................................. 10159735

(51) Int. Cl.
| | |
|---|---|
| A22C 11/02 | (2006.01) |
| A23L 1/317 | (2006.01) |
| A22C 5/00 | (2006.01) |
| B02C 18/38 | (2006.01) |
| B02C 18/36 | (2006.01) |
| A22C 17/00 | (2006.01) |
| B02C 18/30 | (2006.01) |

(52) U.S. Cl.
CPC . *A22C 11/02* (2013.01); *A22C 5/00* (2013.01); *A22C 17/0026* (2013.01); *A23L 1/3175* (2013.01); *B02C 18/365* (2013.01); *B02C 18/38* (2013.01); *B02C 2018/307* (2013.01)

(58) Field of Classification Search
CPC .......... A22C 5/00; A22C 11/02–11/08; A22C 17/0026; B02C 18/30–18/38; A23L 1/3175
USPC ................. 426/646, 105, 140, 135, 231, 518; 452/30–31, 35, 45; 241/24.26
See application file for complete search history.

(56) References Cited

U.S. PATENT DOCUMENTS

| | | | | |
|---|---|---|---|---|
| 2,863,480 | A | * 12/1958 | Combs ........................ | 241/152.1 |
| RE24,683 | E | * 8/1959 | Schnell ......................... | 426/518 |
| 2,917,388 | A | 12/1959 | Sullivan et al. | |
| 3,050,399 | A | * 8/1962 | Kielsmeier et al. ........... | 426/231 |

(Continued)

FOREIGN PATENT DOCUMENTS

| | | |
|---|---|---|
| DE | 2843866 A1 | 4/1980 |
| DE | 29904978 U1 | 6/1999 |

(Continued)

OTHER PUBLICATIONS

European Search Report for EP 10159735.9 dated Nov. 3, 2010.

(Continued)

*Primary Examiner* — Drew Becker
(74) *Attorney, Agent, or Firm* — Marshall, Gerstein & Borun LLP

(57) ABSTRACT

A device and a method of manufacturing and filling up product in the form of fine sausage meat, in particular an emulsion, with a feed means for the product, a feed pump for transporting the product, at least one downstream fine mincer as well as a filling and/or portioning means arranged downstream of the fine mincer for filling up the produced fine sausage meat or the emulsion, respectively.

20 Claims, 7 Drawing Sheets

(56) References Cited

U.S. PATENT DOCUMENTS

| | | | |
|---|---|---|---|
| 3,147,784 A * | 9/1964 | Sloan | 241/47 |
| 3,215,535 A * | 11/1965 | Schmook, Jr. et al. | 426/518 |
| 3,384,139 A * | 5/1968 | Schnell | 241/47 |
| 3,399,704 A * | 9/1968 | Otto | 241/82.5 |
| 3,473,189 A * | 10/1969 | Middleton | 452/31 |
| 3,580,315 A | 5/1971 | Schnell | |
| 3,581,791 A * | 6/1971 | Otto | 241/89.4 |
| 3,613,755 A * | 10/1971 | Otto | 241/89.4 |
| 3,743,192 A * | 7/1973 | Otto | 241/101.8 |
| 3,922,755 A * | 12/1975 | Righele et al. | 452/41 |
| 3,971,851 A * | 7/1976 | Otto | 426/646 |
| 4,023,735 A | 5/1977 | Schnell | |
| 4,047,360 A * | 9/1977 | Minaev et al. | 53/122 |
| 4,112,545 A * | 9/1978 | Covington et al. | 426/646 |
| 4,429,836 A * | 2/1984 | Goransson | 241/282.1 |
| 4,479,614 A * | 10/1984 | Bernard | 241/82.2 |
| 4,567,050 A | 1/1986 | Roth | |
| 4,690,336 A | 9/1987 | Higashimoto | |
| 4,700,899 A * | 10/1987 | Powers et al. | 241/30 |
| 4,747,342 A | 5/1988 | Schack et al. | |
| 4,848,676 A | 7/1989 | Stehr | |
| 5,080,922 A * | 1/1992 | Hosokawa | 426/646 |
| 5,083,507 A * | 1/1992 | Van Haren | 99/472 |
| 5,092,528 A * | 3/1992 | Rudibaugh | 241/65 |
| 5,097,876 A * | 3/1992 | Lagares | 141/249 |
| 5,102,314 A | 4/1992 | Staudenrausch | |
| 5,108,039 A * | 4/1992 | Schnell | 241/34 |
| 5,953,984 A * | 9/1999 | Moessmer et al. | 99/494 |
| 5,965,187 A * | 10/1999 | Freda et al. | 426/513 |
| 6,800,307 B1 * | 10/2004 | Matthews et al. | 426/38 |
| 8,172,545 B2 * | 5/2012 | Wilke | 417/20 |
| 2002/0112616 A1 | 8/2002 | Staudenrausch | |
| 2004/0136261 A1 * | 7/2004 | Huber et al. | 366/152.1 |
| 2005/0037129 A1 * | 2/2005 | Newkirk | 426/646 |
| 2007/0254570 A1 * | 11/2007 | Maile et al. | 452/30 |
| 2008/0035767 A1 * | 2/2008 | Schmid et al. | 241/24.26 |
| 2008/0299885 A1 * | 12/2008 | Maile et al. | 452/31 |
| 2009/0130962 A1 * | 5/2009 | Willburger et al. | 452/31 |
| 2010/0047400 A1 * | 2/2010 | Carlson et al. | 426/92 |

FOREIGN PATENT DOCUMENTS

| | | |
|---|---|---|
| DE | 10152323 A1 | 5/2003 |
| EP | 0218790 A1 | 4/1987 |
| EP | 0247342 A2 | 12/1987 |
| EP | 0432388 A1 | 6/1991 |
| EP | 0962144 A1 | 12/1999 |
| EP | 1 040 758 A1 | 10/2000 |
| EP | 1980323 A1 | 10/2008 |
| GB | 863487 A | 3/1961 |
| GB | 1094495 A | 12/1967 |
| GB | 2064306 A | 6/1981 |
| NL | 6814349 A | 9/1969 |
| WO | WO-0059312 A1 | 10/2000 |

OTHER PUBLICATIONS

Chinese Office Action, Application No. 201110097436.3, dated Oct. 28, 2014.

Notice of Opposition to European Patent No. EP2377405 dated Mar. 7, 2014.

Notification of the Second Office Action, The State Intellectual Property Office of the People's Republic of China, Application No. 201110097436.3, dated Nov. 4, 2013.

* cited by examiner

DEVICE AND METHOD OF MANUFACTURING AND FILLING UP FINE SAUSAGE MEAT, IN PARTICULAR AN EMULSION

CROSS-REFERENCE TO RELATED APPLICATION

The present application claims the benefit of priority of European Application No. 10159735.9, filed Apr. 13, 2010. The entire text of the priority application is incorporated herein by reference in its entirety.

FIELD OF THE DISCLOSURE

The disclosure relates to a device and a method of manufacturing and filling up fine sausage meat, in particular an emulsion.

BACKGROUND

Traditionally, the production of fine sausage meat is carried out in several subsequent steps in different machines. Here, the production is usually subdivided into the following processing steps: pre-mincing—mixing—fine mincing—filling with vacuum filler. That means that the product is initially pre-minced and mixed and this mass is subsequently further minced to produce the fine sausage meat. In fine mincing, often so-called bowl choppers are used. Instead of the bowl chopper, so-called fine mincers can also be used. The finished fine sausage meat is then filled into the hopper of a filling machine to be subsequently filled e.g. into sausage casings. The former production process, however, is complicated, and several independent individual devices are necessary.

It was already described in DE 101 52 323 to connect a mincing machine to a filling machine so that the filling machine can be used not only for filling, but also as feed means. Here, the mincing machine is arranged downstream of the filling machine. For filling, it must be disconnected. The minced product is then collected and subsequently poured again into the hopper of a filling machine. This arrangement neither permits a continuous process. The product is moreover again and again exposed to the surrounding area during production.

SUMMARY OF THE DISCLOSURE

Starting from this situation, one aspect underlying the present disclosure is to provide a device and a method which permit a facilitated continuous processing operation for manufacturing and filling up fine sausage meat.

So, according to the present disclosure, at least one fine mincer is arranged between the filling and/or portioning means and the feed pump. It is thus possible to produce fine sausage meat, in particular an emulsion, in only one device between the feed pump and the filling and/or portioning means and to then fill it in directly afterwards. The filling or portioning means is defined as a means which can either only fill in the product, or which can fill it in and portion it, that means divide it into individual portions. So the filling and/or portioning means can either exclusively be a filling tube, or else be an arrangement which comprises a filling tube and a portioning means, e.g. a wring-off unit or a clip machine, so that divided sausages can be manufactured.

Thus, a continuous processing operation that saves time and thus production costs and also energy can be ensured. The result is improved hygiene in the overall process due to short processing times and no dwelling time of the exposed product in the processing operation. Fine mincer is defined as a mincer which minces the product to such an extent that it has a smaller graining than e.g. in a coarse mincer, and after the last mincing stage has the consistency of fine sausage meat or an emulsion, respectively.

By the product being transported by the feed pump in the form of an adjustable and constant flow of product, the device is suited for producing sausages from fine sausage meat with high portioning accuracy in only one device.

According to a preferred embodiment, at least two mincing stages, i.e. here in the form of a coarse mincer and at least one fine mincer, are arranged between the filling and/or portioning means and the feed pump. It is thus possible to produce fine sausage meat, in particular an emulsion, even from coarser pieces of meat in only one device between the feed pump and the filling and/or portioning means and to then fill it in directly afterwards. Thus, even for coarser pieces of meat which have a diameter of >15 mm, in particular >20 mm, a continuous processing operation can be ensured which saves time and thus production costs and moreover also energy. The graining of the product after the coarse mincer is approximately >2 to 4 mm. In this embodiment, too, the result is improved hygiene in the overall process by short processing times and no dwelling time of the exposed product in the processing operation. By the product being processed in at least two mincing stages, it can be simply ejected as fine sausage meat or emulsion without any major pressure losses. An essential advantage also consists in only one single feed pump being required for coarse mincing and for fine mincing.

The coarse mincer and the fine mincer each comprise several mincing tools of which at least one each is rotating. The mincing tools in the respective mincing stages for example function according to the mincing principles rotor—stator, cutter—perforated plate, perforated plate—perforated plate, as well as a combination of these mincing principles. Here, the speeds of the mincing tools can be adjusted. Thus, the optimal speed can be adjusted for each product and each graining in each mincing stage.

According to a particular embodiment, the device comprises a controlling system which controls the drive of the at least one mincing tool of the fine mincer such that the speed is n >500 rpm. Thus, the product can be sufficiently fine minced to produce fine sausage meat with the fine mincer.

It is advantageous for the device to comprise a central control unit which controls a drive of the feed pump, the coarse mincer and the at least one fine mincer. If there are several fine mincers, their drives can also be controlled by the central control unit. Thus, the speeds of the individual mincing stages can be matched and also adapted to the filling capacity of the feed pump, i.e. the volume flow rate. Moreover, the capacity of the feed pump can also be correspondingly adjusted to a certain filling amount per time unit, so that pressure losses in the respective mincing stages can be compensated.

It is particularly advantageous for the feed pump, the coarse mincer and the at least one downstream fine mincer to each comprise a separate drive motor. Thus, an optimal speed can be adjusted in the various stages and also for the feed pump. This permits very high flexibility as then the combination of the set of cutters, i.e. the different mincing tools in the different mincing stages, can be freely selected and do not have to be adapted to each other. It would be also possible to couple certain drives to each other, so that defined, fixed speed ratios result. Then, however, the speeds must be matched and the sets of cutters adapted to each other.

It is particularly advantageous to provide a feed means for feeding additives between the coarse mincer and the downstream fine mincer, and/or to arrange a corresponding feed means between the fine mincer and a further fine mincer. Here, for example water or ice water can be supplied. Such an addition of further ingredients is required for certain masses to be filled in. By providing another mincing stage downstream of the feed means for feeding additives it can be ensured that these additional ingredients can be well mixed with the product.

It is particularly advantageous for the device to have a cooling which cools the product in the device at least in sections. The product can be cooled, for example, in a region of the mincing stages and/or the connection lines.

That means, according to the disclosure, the feed pump and at least one fine mincer and the downstream filling and/or portioning means or the feed pump, the coarse mincer, the at least one fine mincer and the downstream filling and/or portioning means are firmly connected via a piping system and form a unit. A closed system results. Closed system here means that from the filling pump to the outlet of the filling and/or portioning means, the product does not come into contact with the external atmosphere, which is particularly gentle to the product and hygienic.

It is advantageous for the mincing tools to be arranged in the mincers, in particular as exchangeable set of cutters. This offers maximum flexibility. The degree of mincing can thus be ideally adapted.

That means, in the method according to the disclosure, all manufacturing steps for manufacturing and filling fine sausage meat or an emulsion are carried out in one device. Here, the product is supplied to at least one mincing stage before it can be filled, e.g. via a filling tube. It is advantageous if upstream of the fine mincer, the product is fed in a first mincing stage from the feed pump to a coarse mincer and is pre-minced in the coarse mincer before it is finely minced in a second mincing stage.

As already mentioned, an additive can be supplied between individual mincing stages.

Advantageously, the speed of at least one rotating mincing tool of a mincing stage can be adjusted or controlled, respectively, depending on at least one of the following parameters: discharge of the feed pump, type of product, degree of mincing, i.e. desired degree of mincing after the mincing stage, type of mincing tool.

Thus, an ideal product quality can be ensured. Advantageously, the speeds of the drive of the feed pump and the rotating mincing tools in the different mincing stages are controlled by a central control unit. Thus, the different operating parameters can be easily matched.

The speed of the at least one rotating mincing tool in the first mincing stage is smaller than in the downstream stage or stages and is in particular n≤500 rpm for coarse mincing. The speeds in the downstream stage or stages is n>500 rpm.

The product is fed to the mincing stages under pressure which is generated by the feed pump. Additional feed means are not necessary.

It is particularly advantageous if in the first and the second mincing stages, solid parts, such as for example tendons, flexes, crusts, bone fragments, connective tissues or non-meat parts, such as metal parts, clips, etc., are separated by a separation means.

The fine mincer is operated such that the speed of the at least one rotating mincing tool is n greater 500 rpm.

If only at least one fine mincer is provided and the product is fed to the feed pump as required, it is advantageous to use product pieces having a maximum diameter of 20 mm. It is thus ensured that with exclusively one fine mincer, the fine sausage meat or the emulsion can be manufactured without any major pressure losses occurring or the fine mincer clogging.

It is also possible that an additional feed pump, e.g. in the form of a vane pump or screw pump, is provided downstream of the last mincing stage which pushes the fine sausage meat or the emulsion, respectively, into the filling and/or portioning means, e.g. the filling tube. This has the advantage that in case of too large pressure losses, in particular in several mincing stages, an exact portioning of the product into a sausage casing is possible. Nevertheless, continuous production is possible, where the product remains in the closed system during the manufacture of the fine sausage meat and during filling. This additional feed pump can also be controlled by the common control unit 50.

BRIEF DESCRIPTION OF THE DRAWINGS

The disclosure will be illustrated below in greater detail with reference to the following drawings.

DETAILED DESCRIPTION OF THE PREFERRED EMBODIMENT

Figure 1:
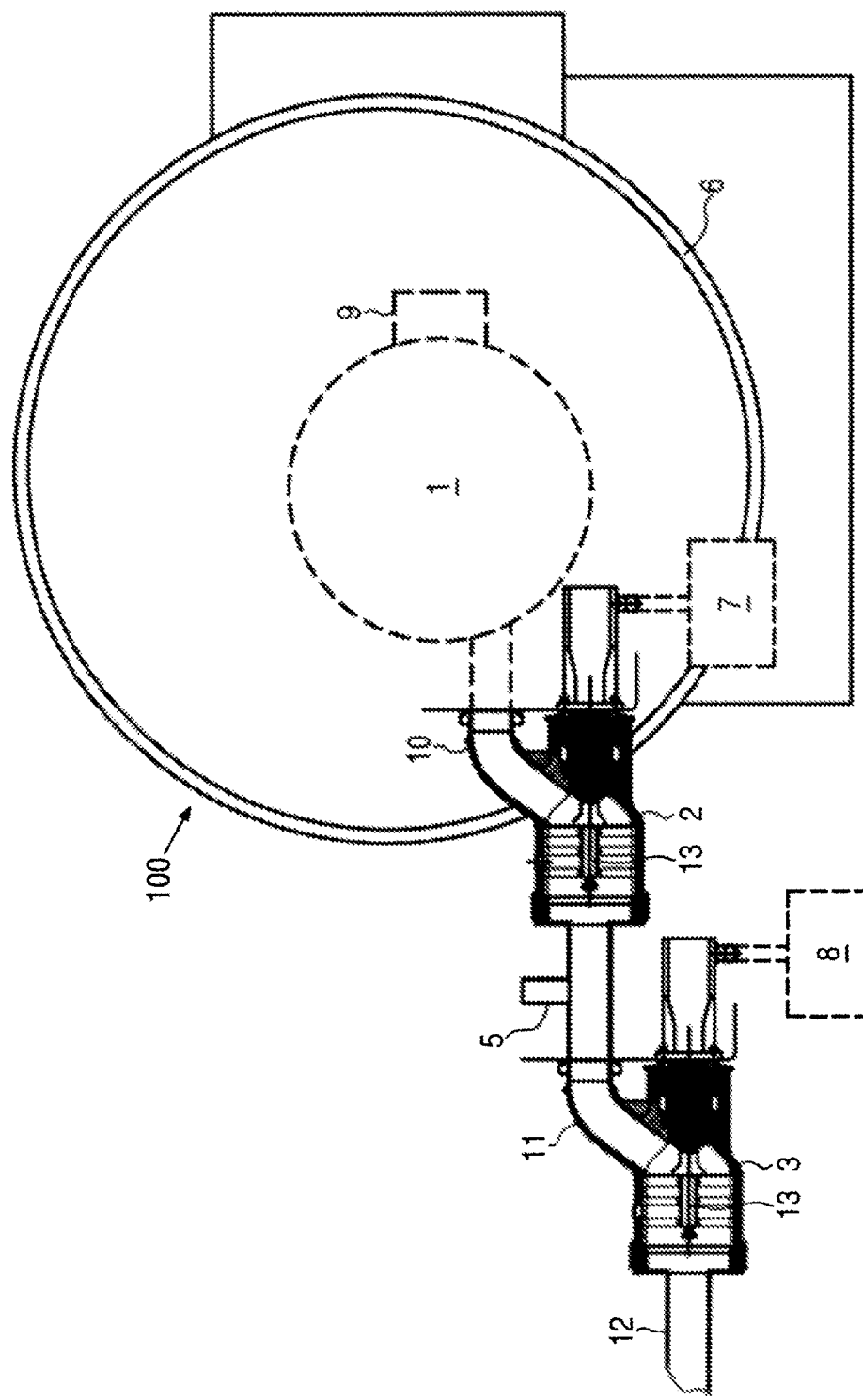
FIG. 1 is a cross-section through a device according to the present disclosure.
Figure 2:
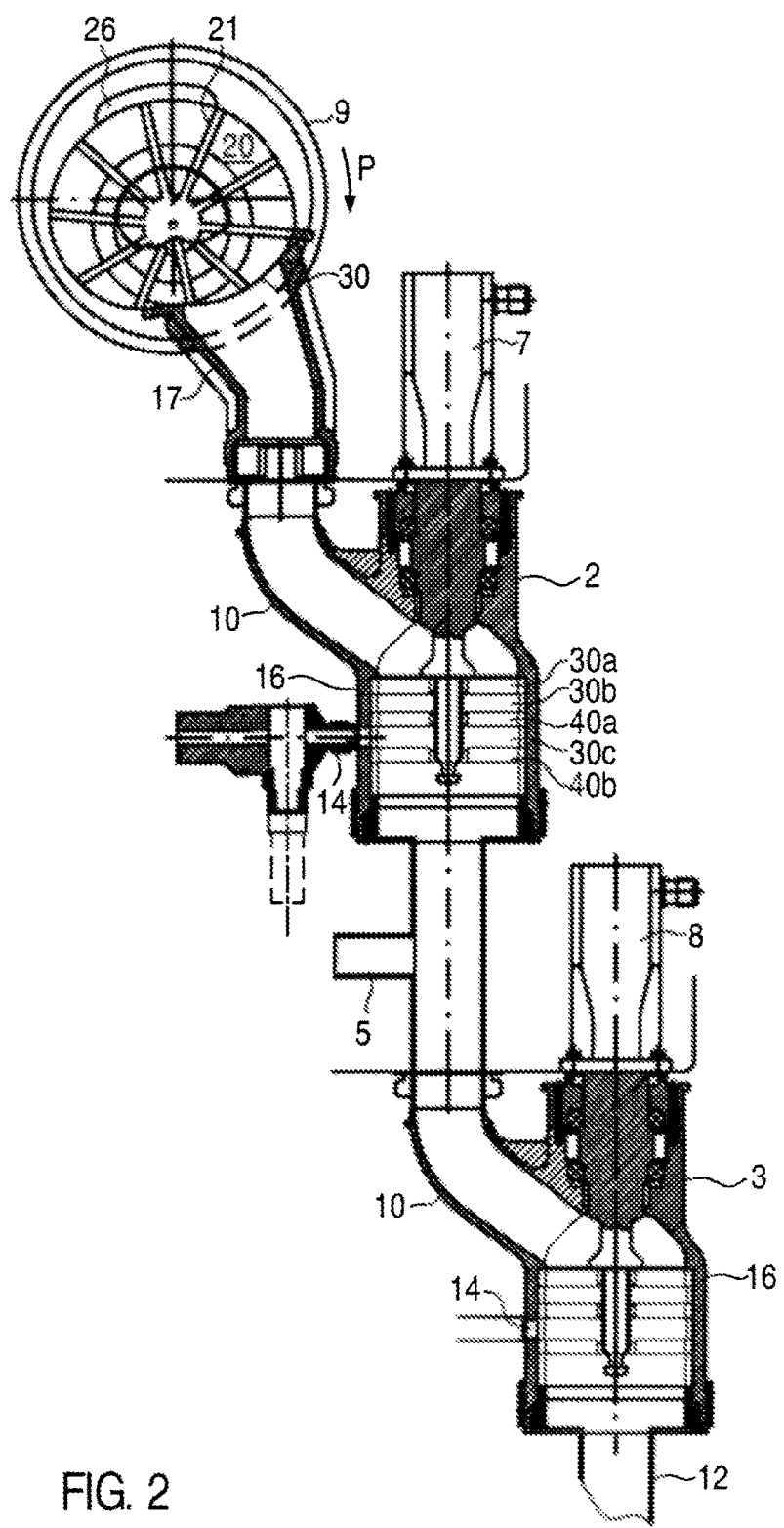
FIG. 2 is a cross-section through a preferred embodiment of a device according to the present disclosure.

It will be seen that FIG. 1 schematically shows an embodiment according to the present disclosure. FIG. 2 then essentially shows the same embodiment, but where some components are represented in greater detail.

Figure 3:
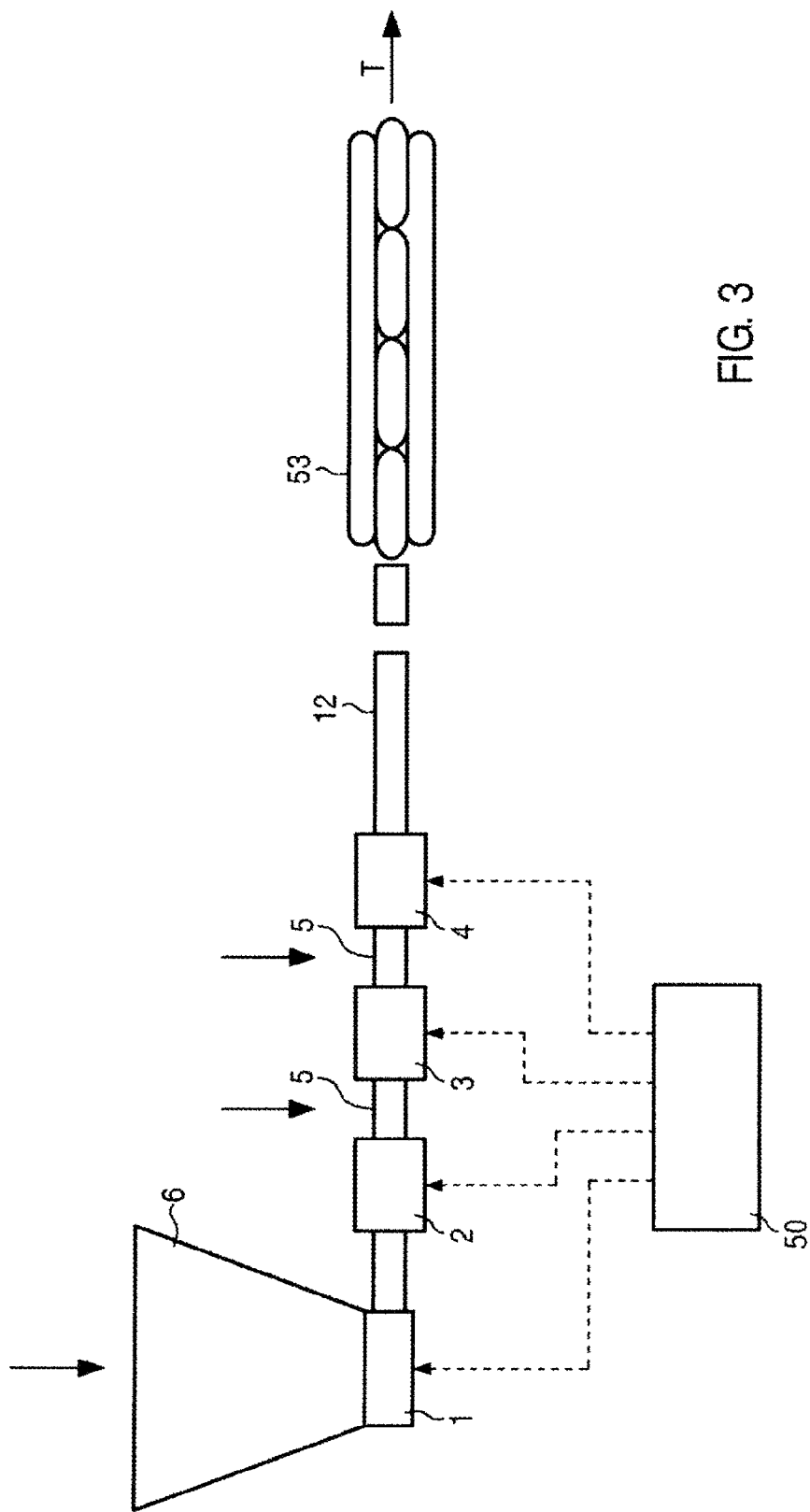
FIG. 3 is a schematic representation of a device according to the present disclosure.

The device 100 comprises a feed means 6, here in the form of a feed hopper for the product. As product, in particular food products, such as meat, bacon, salt and additives, are possible. The size and composition of the product is normally standardized. When the product is filled into the feed hopper 6 it can be pre-mixed. The embodiment shown in FIGS. 2 and 3 is also suited for larger product pieces having a diameter of >20 mm. A feed pump 1 is provided in the lower region of the feed hopper 6. As can be seen in particular in FIG. 2, such a pump can be a vane pump 1 which transports the product with a certain discharge via a feed line 10 to a first mincing stage, here a coarse mincer 2. Here, the feed pump 1 has a separate drive motor 9 (see FIG. 1). Such a vane pump is already known from prior art (for example from EP 0 432 388 B2 and EP 1 040 758 A1) and is therefore not explained in greater detail. The vane pump has, as can be in particular seen in FIG. 2, an inlet 26 for the product as well as radially movable vanes 21 which rotate in the direction of arrow P, where the product reaches the chambers 20 of the vane pump 1 via the feed line 26 and is ejected in the direction of the pump outlet 30 which ends in the connecting pipe 17. Thus, the product is pushed towards the coarse mincer 2. The coarse mincer 10 is firmly connected to the feed pump via the line 10 and has several mincing tools 30*a*, *b*, *c;* 40*a*, *b* of which at least one is rotating.

Figure 4:
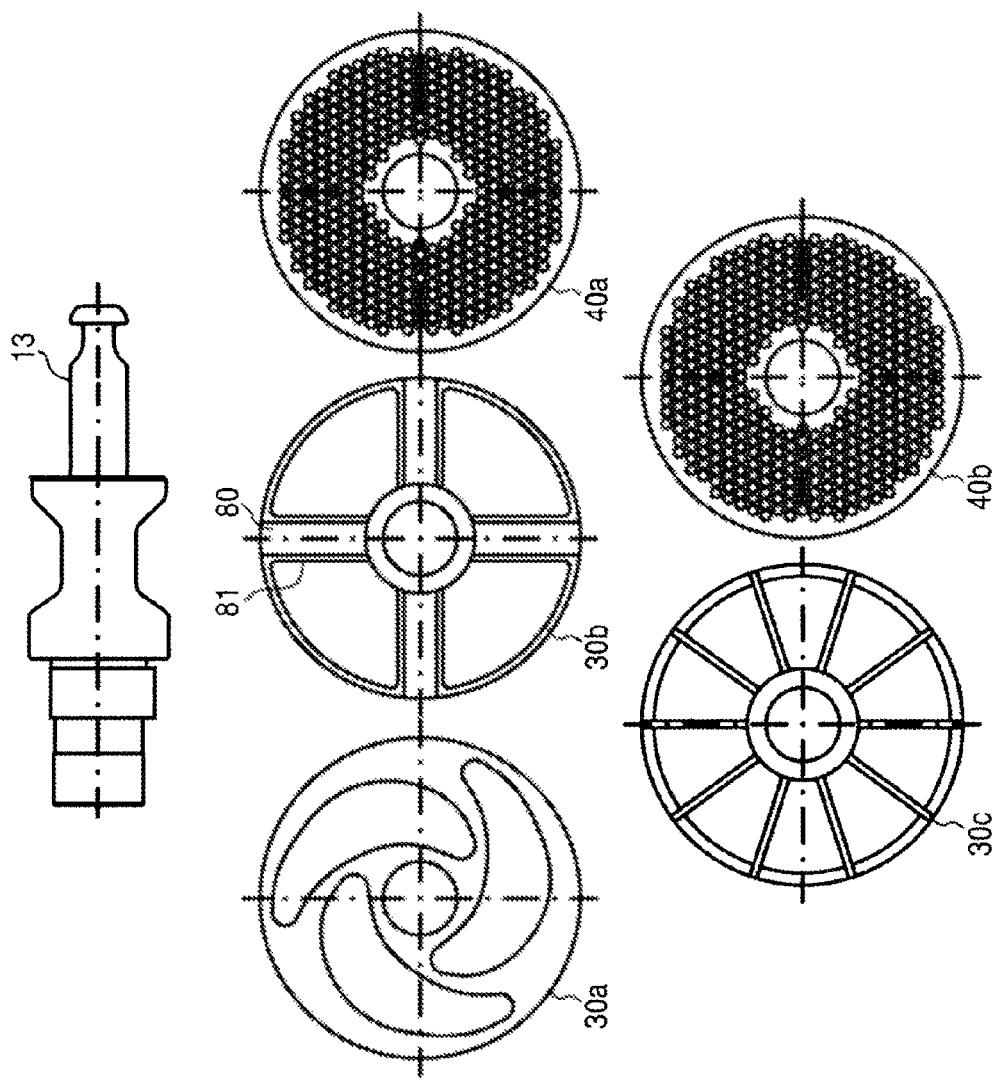
FIG. 4 shows an example of a set of cutters of a mincing stage.

FIG. 4 shows an example of a corresponding set of cutters. The set of cutters has a fixed precutter 30*a*, a hollow-arm cutter 30*b* with hollow cutter arms 81 which can be driven via the shaft 13, a fixed perforated plate 40*a*, another cutter 30*e* that can be driven by the shaft 13, as well as a final perforated plate 40*b*. The hollow arm cutter is a sorting cutter and here comprises several, radially extending hollow spaces 80 which are opened to the outside and laterally limited by two blades each. The hollow spaces are directed towards the perforated plate 40*a*. In the hollow arm sorting cutter 30*b*, the solid parts collect at the inner diameter and are guided outwards through the hollow arms as a consequence of the product pressure and can be discharged via an opening 14 in the housing 16 of the mincer 2.

For driving the shaft 13, a separate drive motor 7 in the form of an electric motor is provided. The motor 7 rotates the shaft 13 about the axis A, whereby the cutters 30*c*, *b* mounted on the shaft are rotated about the axis.

The set of cutters shown in FIG. 4 is only an example. Different mincing tools which work according to the following mincing principles can be used: cutter—perforated plate, fixed perforated plate—rotating perforated plate, rotor—stator, as well as a combination of these mincing principles. In the rotor-stator system, the cutting system comprises e.g. a stationary stator ring which surrounds a rotatingly driven cutting rotor. The stator rings as well as the cutting rotor have cleats disposed in the direction of the axis of rotation. Such sets of cutters working according to the rotor-stator principle are described, for example, in EP 1 980 323 B1.

Advantageously, the sets of cutters are arranged in the individual mincing stages as overall unit or such that they can be exchanged partially. A set of cutters can be exchanged easily.

As can be seen in particular in FIGS. 1 and 2, a connecting line 11 is provided downstream of the coarse mincer 2 which leads to another mincing stage, in this case the fine mincer 3. A feed means 5 for further ingredients, such as e.g. water, ice water or other additives, is provided in the line 11. The feed line can be closed by a not represented valve.

The second mincing stage is a fine mincer 3 and also comprises at least one rotating mincing tool and is otherwise structured as was described in connection with the mincer 2. In this embodiment, the fine mincer comprises a separate drive motor 8. The set of cutters for the fine mincer 3 is selected such that a desired degree of mincing can be obtained. In the embodiment shown in FIG. 1, the device comprises two mincing stages after which the finished fine sausage meat or the emulsion, respectively, can be filled up. The emulsion or the fine sausage meat, respectively, is in this case ejected by a filling and/or portioning means 12 adjacent to the fine mincer 3. The filling or portioning means can be exclusively formed by a filling tube or else comprise still further components, such as for example a wring-off unit, e.g. a wring-off gear for rotating the filling tube or a clip means for placing a clip dividing a filled sausage, as will be illustrated more in detail below.

So the feed pump 1, the coarse mincer 2 and at least one further fine mincer 3 are firmly connected via the pipings 10, 11. The filling and/or portioning means 12, here as filling tube 12, also directly follows the fine mincer 3, so that a closed system is formed.

Furthermore, the device 100 can comprise a (not represented) cooling device which cools the product in the device 100 at least in sections, in particular in a region of the mincing stages and/or the connecting lines 11. The cooling device can be embodied, for example, in the form of a heat exchanger and be externally arranged at the device 100.

Though in FIGS. 1 and 2 only two mincing stages are shown, several mincing stages can also be provided.

It is advantageous for the mincing stages, i.e. the mincers, to each have their own drive motor 7, 8 and also for the filling pump 1 to have its own drive motor 9, such that the mincing tools can be driven independently. Thus, the speeds can be varied and adjusted to optimal values.

Advantageously, the drives of the different mincing stages (in this embodiment three), here designated with 2, 3 and 4, are controlled by a common central control unit 50 of the device, as can be seen in particular in FIG. 3. The central control unit 50 can also control further elements of the device, such as e.g. wring-off gears or the drive 52 or the clip means (not represented), cooling, etc. The device can comprise an operator interface via which the speeds n of the rotating tools for the different mincing stages and the discharge of the feed pump can be entered.

It is also possible not to provide a separate drive motor for each mincing stage and the filling pump but to rather couple certain drives with each other. In the embodiments shown in FIGS. 1 and 2, it is for example possible to provide a coupling of the drives of the feed pump 1 as well as of the coarse mincer 2, or a coupling of the feed pump 1 with the coarse mincer 2 and the fine mincer 3, or else a coupling of the drives for the mincers 2, 3. If there are more than two mincing stages, the other drives can also be coupled with the drive of the feed pump and/or all or individual drives of the other mincers. Then, a fixed speed ratio results. The speeds, however, then must be matched. An optimal production setting is only possible if the combination of the parts of the sets of cutters of the individual mincing stages are matched.

Figure 6:
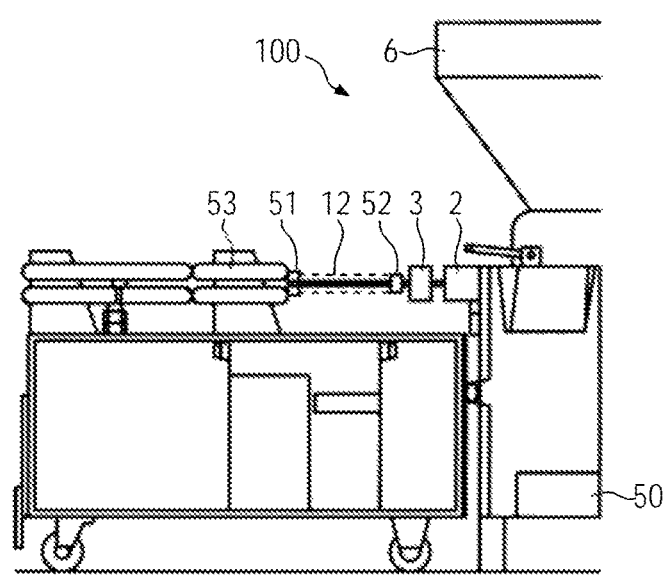
FIG. 6 schematically shows the overall view of a device for manufacturing and filling fine sausage meat into a sausage casing according to the present disclosure.

The fine sausage meat or the emulsion, respectively, is filled up by means of the filling and/or portioning means 12 in a known manner, for example into a sausage casing. To this end, the filling tube 12 can comprise, as is well known and can be seen in FIG. 6, a casing brake 51 over which a sausage casing tightened up over the filling tube 12 can be guided and tightened. By ejecting the product, the sausage casing can thus be pulled from the filling tube 12 in the direction of transport T. Reference numeral 52 designates a wring-off gear for forming a wring-off point between individual sausages. This means that the filling tube 12 can be rotated together with the casing brake 51 about the longitudinal axis, and a wring-off point can be created by holding the sausage over and against a transport means 53. The transport means is here formed by transport means running in opposite directions, here continuous belts running in opposite directions.

However, it is also possible to divide the sausages not by wringing them off, but, for example, by displacing the pasty mass in the sausage casing by placing a clip.

It is also possible that after the final mincing stage, in FIGS. 1 and 2 the fine mincer 3, another conveyor means is arranged (not represented), e.g. in the form of another vane pump or else a conveyor screw, which transports the fine sausage meat or the emulsion, respectively, into the filling and/or portioning means, i.e. into the filling tube 12. It can thus be ensured that the product is pushed out of the filling tube 12 constantly and in accurate portions, even if high pressure losses in the individual mincing stages occur.

Figure 5:
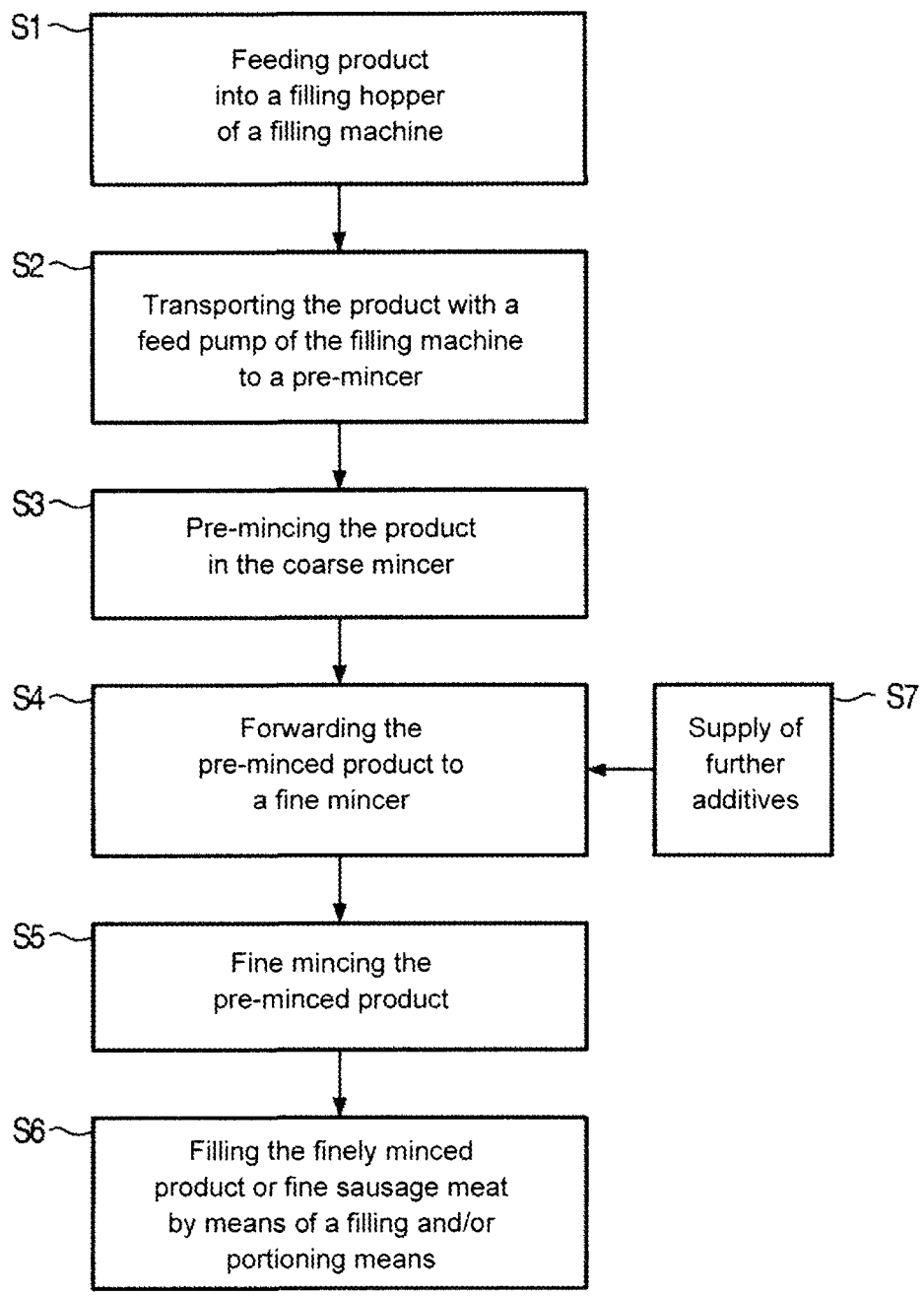
FIG. 5 shows a flow chart of the method according to the disclosure.

Hereinafter, the method will be illustrated more in detail in connection with FIG. 5.

First, product is fed into the feed hopper 6 of the device as required, in this case to the filling machine (S1).

The product is under pressure pushed into the line 10 by the feed pump 1, here the vane pump (S2). The capacity of the filling pump or the feed of the product corresponds to the required quantities and can be adjusted. This means a constant product feed, i.e. a constant flow of product, to the first mincing stage is taken care of. The pump can work continuously, for example if the sectioning points in the filled sausage length are created by wringing off. If the sectioning points are created by placing a clip, the feed pump works intermittently.

In the first mincing stage 2, the product is coarsely minced in the coarse mincer 2 (S3). By the selection of the mincing tools 30, 40 and by the speed of the rotating mincing tools or cutters 30c, b, a certain desired degree of mincing can be adjusted. The speed in the coarse mincer 3 is ≤500 rpm for generating the coarsely minced product. The rotating mincing tools 30, 40 are here driven by the drive motor 7. The drive motor 7 is, just as the drive 9 of the feed pump 1, controlled by the central control unit 50.

After coarse mincing, the product 11 is pushed further to the fine mincer 3 via the line 11 (S4). In the line 11, an additive, such as water or ice water, is then optionally supplied via the feed line 5 (S7).

In the fine mincer 3, the meat is then finely minced, so that fine sausage meat or an emulsion is produced (S5). The drive motor 8, too, is controlled by the central control unit 50. For fine mincing, the speed of the mincing tool in the fine mincer is n>500 rpm, but can also be >2000 rpm.

The fine sausage meat is then filled up via the filling and/or portioning means 12 and in particular pushed into a sausage casing as described above (S6).

The speed of the at least one rotating mincing tool 30b, 30c can be adjusted depending on at least one of the following parameters: discharge of the feed pump 1, type of product, desired degree of mincing, type of mincing tool. This means, the higher the discharge of the feed pump, the higher is the speed of the mincing tool. As the degree of mincing increases, the speed of the mincing tool also increases.

In the mincing stages, solid parts can be discharged via the respective discharge line 15. An additional external cooling of the product is possible at least in sections.

The method was illustrated in connection with two mincing stages, however, several mincing stages can also be provided between the feed pump and the filling and/or portioning means.

It is also possible to only drive one mincing stage.

Figure 7:
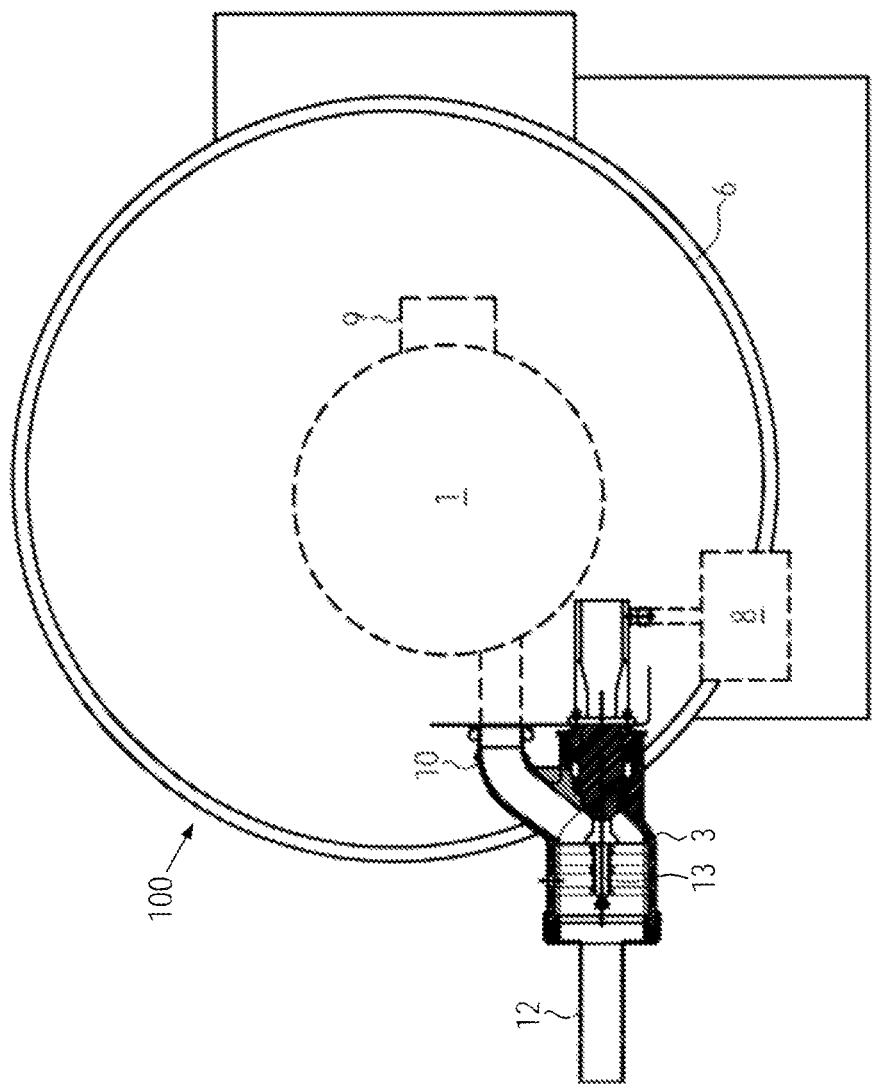
FIG. 7 shows another embodiment according to the present disclosure.

FIG. 7 shows a further embodiment according to the present disclosure. This embodiment essentially corresponds to the embodiment shown in connection with the previous figures, so that a repetition of the corresponding features is omitted. The difference between this embodiment and the previous embodiment is that here only one fine mincer follows the feed pump 1 and that no coarse mincer 2 is arranged between the fine mincer and the feed pump 1. Instead, the feed line 10 directly ends in the downstream fine mincer 3. Though it is not represented, at least one further fine mincer could also be arranged downstream of the fine mincer 3 in the direction of transport of the product, before the arrangement ends in a filling and/or portioning means 12, here in the form of a filling tube 12. As in the previous embodiments, the filling and/or portioning means can here exclusively be formed by a filling tube 12 or in addition, as illustrated in connection with FIG. 6, comprise a wring-off means 52 or a non-depicted clip means. Though it is not represented, a casing brake is again preferably arranged on the filling tube 12. The fine mincer 3 is driven by the control unit 50 such that it produces fine sausage meat or an emulsion, respectively, where the speed n is in any case >500 rpm. Here, too, the fine mincer 3 and the feed pump 1 have different drives 8, 9. As the drives are not coupled, the fine mincer 3 can be driven at high speed to produce the fine sausage meat or the emulsion, respectively.

The operating procedure of the embodiment shown in FIG. 7 essentially corresponds to the method as it was illustrated in connection with FIG. 5, with the exception that steps S2, S3 and S6 are omitted. The product is fed to the filling machine as required. In this manner, a continuous flow of product can be generated. Here, the product comprises already small prefabricated product pieces, here small meat pieces, which have a maximum diameter of about 20 mm, in particular about 15 mm. The discharge of the feed pump 1 can be adjusted, such that the feed pump transports a constant flow of product, so that an exact portioning accuracy of the produced sausages can be achieved. In the fine mincer 3, the product is finely minced and then ejected via the filling and/or portioning means to fill up the produced fine sausage meat or the emulsion, respectively.

The device 100 is embodied as a closed system in all embodiments. The device can be designed in the form of a vacuum filler, so that a vacuum can be set already in the filling pump. Advantageously, the complete device is designed to be pressure tight. Thus, the introduction of oxygen into the product can be prevented. The result is improved hygiene in the overall process by short processing times and no dwelling time of the exposed product in the processing operation. A continuous production of sausage meat is possible. The energy costs can be essentially reduced. Altogether, the production costs can be reduced.

The invention claimed is:

1. A vacuum filler for manufacturing and filling up product in the form of one of a fine sausage meat or a fine sausage meat emulsion, comprising:
    a feed means for meat products;
    a feed pump for transporting the product in the form of an adjustable and constant flow of product, wherein the product is fed to mincing stages under pressure generated by the feed pump wherein the capacity of the feed pump can be adjusted to a certain filling amount per time unit so that pressure losses in the respective mincing stages can be compensated;
    a coarse mincer positioned downstream from and supplied product from the feed pump;
    at least one fine mincer positioned downstream from the coarse mincer wherein the at least one fine mincer minces the product into a smaller grain size than a grain size of the product minced by the coarse mincer, wherein each of the feed pump, the coarse mincer and the at least one fine mincer are driven with a separate drive motor;
    a filling tube arranged downstream of the at least one fine mincer, for filling up the produced fine sausage meat or the emulsion into a sausage casing; and
    a central control unit connected to the drive motor of each of the feed pump, the coarse mincer and the at least one fine mincer, and adjusting a speed of a rotating mincing tool of each of the coarse and the at least one fine mincers depending on at least one of the following parameters: discharge of the feed pump, type of product, degree of mincing and type of mincing tool, the vacuum filler being embodied as a closed system, so that a vacuum can already be set in the feed pump and the complete vacuum filler is pressure tight, the feed pump, the coarse mincer and at least one further fine mincer are firmly connected via pipings in this sequence and the filling tube directly follows the fine mincer so that a closed system is formed.

2. The device according to claim 1, wherein at least one of the coarse mincer and of the at least one fine mincer comprises a plurality of mincing tools, of which at least one of the coarse and of the at least one fine mincers are operable at an adjustable speed.

3. The device according to claim 2, and the central control unit connected to the drive motor of the at least one fine mincer adjusts the at least one fine mincer such that a speed n of at least one of the several mincing tools of the at least one fine mincer is greater than 500 rpm.

4. The device according to claim 2, further comprising mincing tools within the mincers are arranged as an exchangeable set of cutters.

5. The device according to claim 1, further comprising an additives feed means positioned downstream from the coarse mincer and upstream from the at least one fine mincer to feed additives to the product.

6. The device according to claim 1, further comprising a cooling means associated with the device which cools the product in the device.

7. The device according to claim 6, wherein the cooling means cools the product in at least one of the coarse mincer, the at least one of the fine mincer and the connection lines.

8. The device according to claim 6, wherein the cooling means comprises a heat exchanger.

9. The device according to claim 1, wherein one of the feed pump, the at least one fine mincer, the filling tube, or the feed pump, the coarse mincer, at least one fine mincer and the filling tube, are connected one of firmly or releasably via a piping forming a closed system.

10. The device according to claim 1 further comprising an additional fine mincer positioned downstream from the at least one fine mincer, wherein a feed means is positioned between the at least one fine mincer and the additional fine mincer.

11. Method of continuously manufacturing and filling up product in the form of one of fine sausage meat or a fine sausage meat emulsion, with a vacuum filler according to claim 1, comprising:
  a) supplying meat products to a feed pump, wherein the product is fed to mincing stages under pressure generated by the feed pump wherein the capacity of the feed pump can be adjusted to a certain filling amount per time unit so that pressure losses in the respective mincing stages can be compensated;
  b) forwarding the product downstream from the feed pump to a coarse mincer;
  c) mincing the product in the coarse mincer;
  d) forwarding the product from the coarse mincer downstream to an at least one fine mincer;
  e) finely mincing the product in the at least one fine mincer into a grain size smaller than a grain size of the product minced by the coarse mincer wherein the feed pump, the coarse mincer and the at least one fine mincer are each driven with a separate drive motor; and
  f) filling up the one of the fine sausage meat or the emulsion, via one of a downstream filling tube into a sausage casing;
  further comprising controlling the speeds of a drive motor of the feed pump and of rotating mincing tools in the coarse and the at least one fine mincers with a central control unit, and adjusting a speed of a rotating mincing tool of each of the coarse and the at least one fine mincers depending on at least one of the following parameters: discharge of the feed pump, type of product, degree of mincing and type of mincing tool, the vacuum filler being embodied as a closed system, so that a vacuum can already be set in the feed pump and the complete vacuum filler is pressure tight, wherein the feed pump, the coarse mincer and at least one further fine mincer are firmly connected via pipings in this sequence and the filling tube directly follows the fine mincer so that a closed system is formed.

12. Method according to claim 11, and the step of finely mincing the product in the at least one fine mincer, further comprises supplying the product to at least one further mincer and mincing the product before the step of filling up.

13. Method according to claim 11, further comprising the step of adding an additive to the product wherein the additive is added to the product between at least one of the coarse and the at least one fine mincer and between the at least one fine mincer and any further mincing operation positioned downstream of the at least one fine mincer.

14. Method according to claim 13, wherein the additive comprises one of water or ice water.

15. Method according to claim 11, wherein a speed of a rotating mincing tool within the coarse mincer is less than a speed of a rotating tool within the at least one fine mincer or of a mincer downstream from the at least one fine mincer, wherein at least one of the speed of the rotating tool of the at least one fine mincer and of the mincer downstream from the at least one fine mincer is n greater than 500 rpm.

16. Method according to claim 15, wherein the speed n of the at least one rotating mincing tool in the coarse mincer is less than or equal to 500 rpm.

17. Method according to claim 11, further comprising supplying the product to the coarse mincer and to the at least one fine mincer under pressure.

18. Method according to claim 11, further comprising, providing an additional feed pump positioned upstream from the at least one filling tube for pushing the fine sausage meat or the emulsion into the at least one filling tube.

19. Method according to claim 11, wherein a speed n of at least one rotating mincing tool of the fine mincer is greater than 500 rpm.

20. Method according to claim 11, further comprising cooling the product at least in sections in the device.

* * * * *